Aug. 28, 1923.
J. E. RAZE
SEED SEPARATOR
Filed Feb. 5, 1920
1,466,560
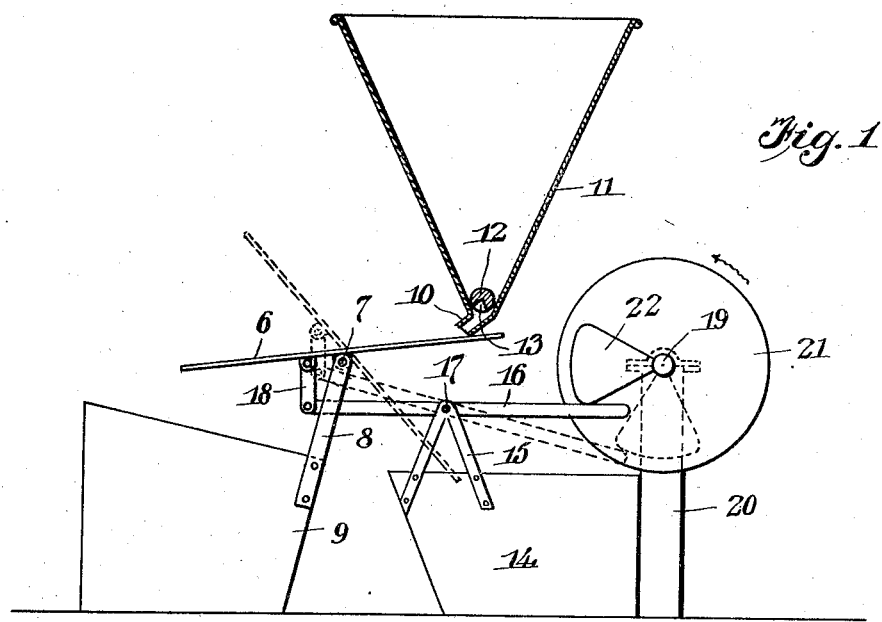
Fig. 1.
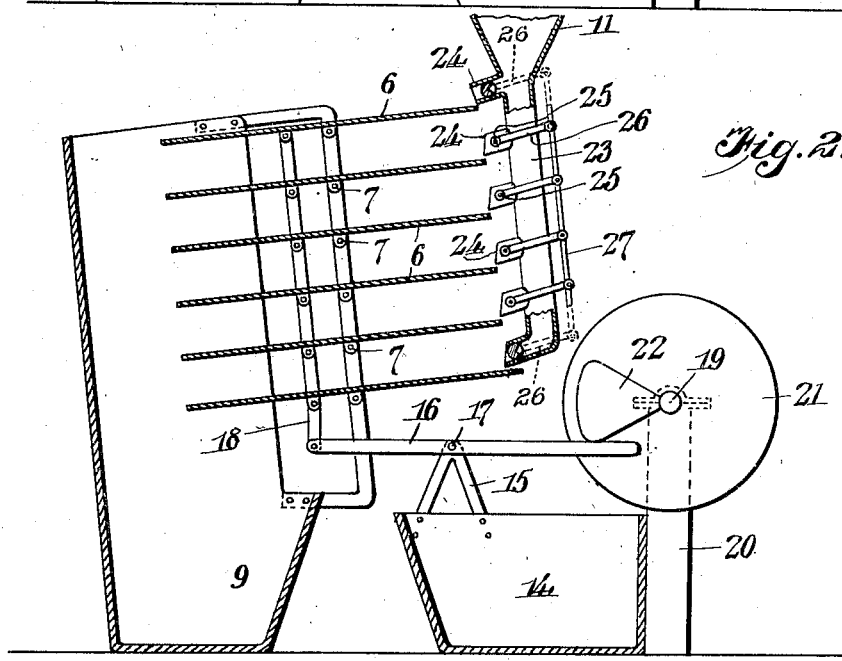
Fig. 2.
Fig. 3.
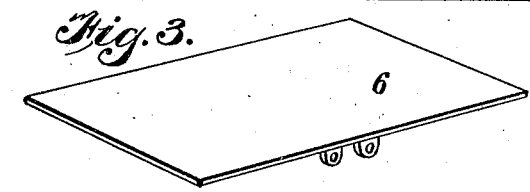
Inventor
J. E. Raze
By
Attorney Patented Aug. 28, 1923.

1,466,560

UNITED STATES PATENT OFFICE.

JAMES E. RAZE, OF PORTLAND, OREGON.

SEED SEPARATOR.

Application filed February 5, 1920. Serial No. 356,521.

*To all whom it may concern:*

Be it known that I, JAMES E. RAZE, a citizen of the United States, residing at Portland, in the county of Multnomah and State of Oregon, have invented new and useful Improvements in Seed Separators, of which the following is a specification.

This invention relates to seed separators, the general object of the invention being to provide a separating structure of simple and improved construction in operation which will efficiently operate to cause seed of different kinds to be separated from each other and to be deposited in receptacles to receive them.

A further object of the invention is to provide a separating device utilizing gravity as an important factor in the separating operation, and which, being wholly automatic in operation, requires no attention.

With these objects in view, together with others which will appear as the description proceeds, the invention resides in the novel construction, combination and arrangement of parts, all as will be described more fully hereinafter, illustrated in the drawings and particularly pointed out in the claims.

In the drawings,

Figure 1 is a fragmentary side elevation of a seed separating machine embodying the preferred form of the invention, Figure 2 is a similar view showing a modified form of the separating device, Figure 3 is a detail perspective view of one of the separator plates or platforms employed in connection with the separating device.

Referring now to the drawings and particularly to Figure 1 thereof, the invention embodies a tiltable platform or plate 6 pivoted as at 7 intermediate its ends to an upright or support 8. This support may be mounted upon any suitable framework or bed, in the present instance being rigidly fastened to one end of a front or primary seed receptacle 9. The platform 6 normally inclines downwardly at its forward end, which overhangs the receptacle 9, and the seed is deposited upon this platform near the rear end thereof through the constricted outlet 10 of a hopper 11. The flow of seed through the said constricted outlet is controlled by a rotary valve 12, the latter being arranged directly in or adjacent to said outlet and having a pocket 13 which carries a determined quantity of seed and causes it to be dropped in such position as to pass through the outlet 10 and upon the inclined platform 6. The seed therefore is delivered to the inclined platform intermittently and in comparatively small quantities, and by reason of the slight inclination of the platform the round seed, such as mustard seed, will by action of gravity roll forwardly down the platform and off the forward end thereof and into the receptacle 9. The seed of more or less flat nature, such as alfalfa seed, will not roll and will therefore remain upon the platform. It is my intention to remove the seed which remains upon the platform by tilting the latter rearwardly to such degree as to permit the flat seed by the action of gravity to fall therefrom.

A rear or secondary receptacle 14 is arranged to underlie the rear end of the platform and in position to receive seed delivered from the latter. This receptacle has secured thereto an upstanding bracket 15 to which an operating arm 16 is pivoted intermediate its ends as at 17. The forward end of this arm is connected to the platform 6 by means of a link 18, the link being connected to the platform forwardly of the pivotal support of the latter. A shaft 19 is supported upon suitable standards 20 near the rear end of arm 16, and this shaft carries a drive or operating wheel 21. This operating wheel or pulley is provided with a cam member 22 which acts as a tripper for the rear end of arm 16. It is obvious, therefore, that as the drive wheel 21 rotates in counter-clockwise direction, the cam or tripper member 22 will contact with the rear end of arm 16 and cause the said rear end to be depressed, whereupon the platform 6 is tilted rearwardly so as to deposit the contents thereof in receptacle 14. After the tripper cam 22 passes beyond the rear end of the arm 16 the platform will move back to initial position, that is, in a position inclining forwardly, as shown by full lines in Figure 1.

Any preferred means for rotating the valve 12 may be employed. As this valve rotates the quantities of seed within the pocket 13 thereof will be deposited upon the forwardly inclined platform, whereupon those seed offering the least resistance, such as round seed, will roll forwardly and off the end of the platform into the receptacle 9. Those seed offering a greater degree of frictional resistance will remain upon the platform until the tripper mechanism comes into operation, whereupon they will fall into the receptacle 14. The tripping mechanism is so arranged as to cause the platform 6 to tilt rearwardly to a sufficient inclination to cause the flat seed to readily fall therefrom into the receptacle 14.

It will be observed from the foregoing that my invention provides an apparatus in which the hopper has an outlet slot or passage of restricted size arranged for the direct discharge of the seed upon the platform 6, and that the valve 12 is arranged within or directly adjacent to said hopper outlet, said valve being circular in cross-section and peripherally contacting with the walls of the outlet and being provided with a pocket 13 or otherwise so constructed as to effect the positive discharge of a predetermined quantity of seed at a time directly upon the tilting platform, the said outlet being therefore at all times closed against the discharge of seed except such seed as are taken up and carried outwardly by the pocket 13. This is very important since alfalfa, mustard or flaxseed will leak through the slightest opening and will not bank properly upon the tilting separator platform unless directly deposited thereon in such manner as to provide for the deposit of all the seed to be separated at the same time, so that, with proper regard to the degree of inclination of the platform 6, separation of the seed in a thorough and effective manner will occur through the travel of one kind of seed within a predetermined period faster than another or the other kinds of seeds from which it is to be separated. This is also important for the reason that the time period of travel of the seed is limited, and provision must be made to allow the seed to separate for travel and final separation within such period, and the best results are therefore gained by depositing a restricted amount of seed upon the tilting platform at one time and making the separating operations through the tilting motions of the table in a comparatively rapid manner, so as to admit of the separation of a large amount of seed within any calculated working period.

The modified form of separator shown in Figure 2 of the drawings includes the use of a number of superimposed platforms 6, all of which are arranged in parallelism. These platforms are all pivoted as at 7 to a suitable standard or support, and all are connected as by means of the links 18 with the forward end of the tripper arm 16. The hopper 11 is provided with a downwardly extending restricted portion 23, from which constricted outlet spouts 24 project in such position as to deliver seed to the various spaced platforms 6. The flow of seed from each of the spouts 24 is controlled by pocketed valves 25 similar to valve 12 arranged within the portion 23, the stems 25' of the said valves being connected to arms 26. The arms 26 are connected in unison to a rod 27, so that operation of the rod will cause all of the valves to operate simultaneously. The tripper mechanism in this form of the invention is the same as that shown in connection with Figure 1. The seed falling through the spouts 24 to the various platforms 6 will be separated in the manner described, and the tripper mechanism coming into operation will cause all of the platforms 6 to tilt rearwardly at one time so that the seed remaining thereon will fall rearwardly into the hopper 14.

From the foregoing it is obvious that I have provided a seed separating device of extremely simple construction and operation and yet which will prove thoroughly efficient in practice. As has been before stated the control valve 12 in Figure 1 of the drawing may be operated in any preferred manner, so that the desired quantity of seed may be deposited upon the platform at the proper time. In Figure 2 of the drawing the various spouts 24 discharge their seed contents upon their respective platforms at the same time so that proper operation of all the seed separating devices is assured.

It will be understood that various changes in the construction and assemblage of parts may be resorted to without departing from the spirit of the invention as set forth in the claims.

Having thus fully described my invention, I claim:—

1. In a seed separator, the combination of a tilting platform, a centrally pivoted lever fulcrumed on one side of the center of the fulcrum of the platform and having one end thereof extending beyond the opposite side of the center of the fulcrum of the platform, a pivotal connection between such end of the lever and the adjacent portion of the platform, said lever being arranged below the level of the platform, means acting upon the opposite end of the lever for periodically tilting the same and the platform, and a hopper arranged immediately above the platform and having a controlling valve for directly discharging seed upon the platform.

2. In a seed separator, the combination of spaced primary and secondary receptacles, a hopper having a restricted discharge outlet, a tilting platform pivotally mounted between its ends, said platform having one end portion arranged above the primary receptacle and its other end portion arranged above the secondary receptacle and beneath the hopper outlet, a rotary valve of circular form in cross-section peripherally contacting with and normally closing the hopper outlet, said valve having a pocket to receive and discharge, on each revolution thereof, a predetermined quantity of seed upon the platform, while at all times closing said outlet, a centrally pivoted lever fulcrumed in rear of the fulcrum of the platform and having its forward end extending forwardly beyond the center of the fulcrum of the platform, a pivotal connection between said forward end of the lever and the forward end of the platform, said lever being arranged below the level of the platform, and means acting upon the rear end of the lever for periodically tilting the same and the platform.

3. In a seed separator, the combination of front and rear receptacles, a hopper arranged above the level of said receptacles and having a discharge outlet, a valve controlling said outlet, a tilting platform fulcrumed between its ends and having a forward portion in advance of its fulcrum arranged to overlie the front receptacle and a rear portion normally disposed below the hopper outlet and overlying the rear receptacle, a lever centrally pivoted in rear of the fulcrum of the platform and having a forwardly extending end portion projecting in advance of the fulcrum of the platform, a pivotal connection between said forward end of the lever and the forward portion of the platform, and means acting upon the rear end of the lever for periodically tilting the same and the platform.

In testimony whereof I affix my signature.

JAMES E. RAZE,